(No Model.) 11 Sheets—Sheet 5.
J. P. DUNN & J. BRADY.
APPARATUS FOR PRINTING, REGISTERING, AND DELIVERING
PASSENGER TRANSPORTATION TICKETS.
No. 417,994. Patented Dec. 24, 1889.
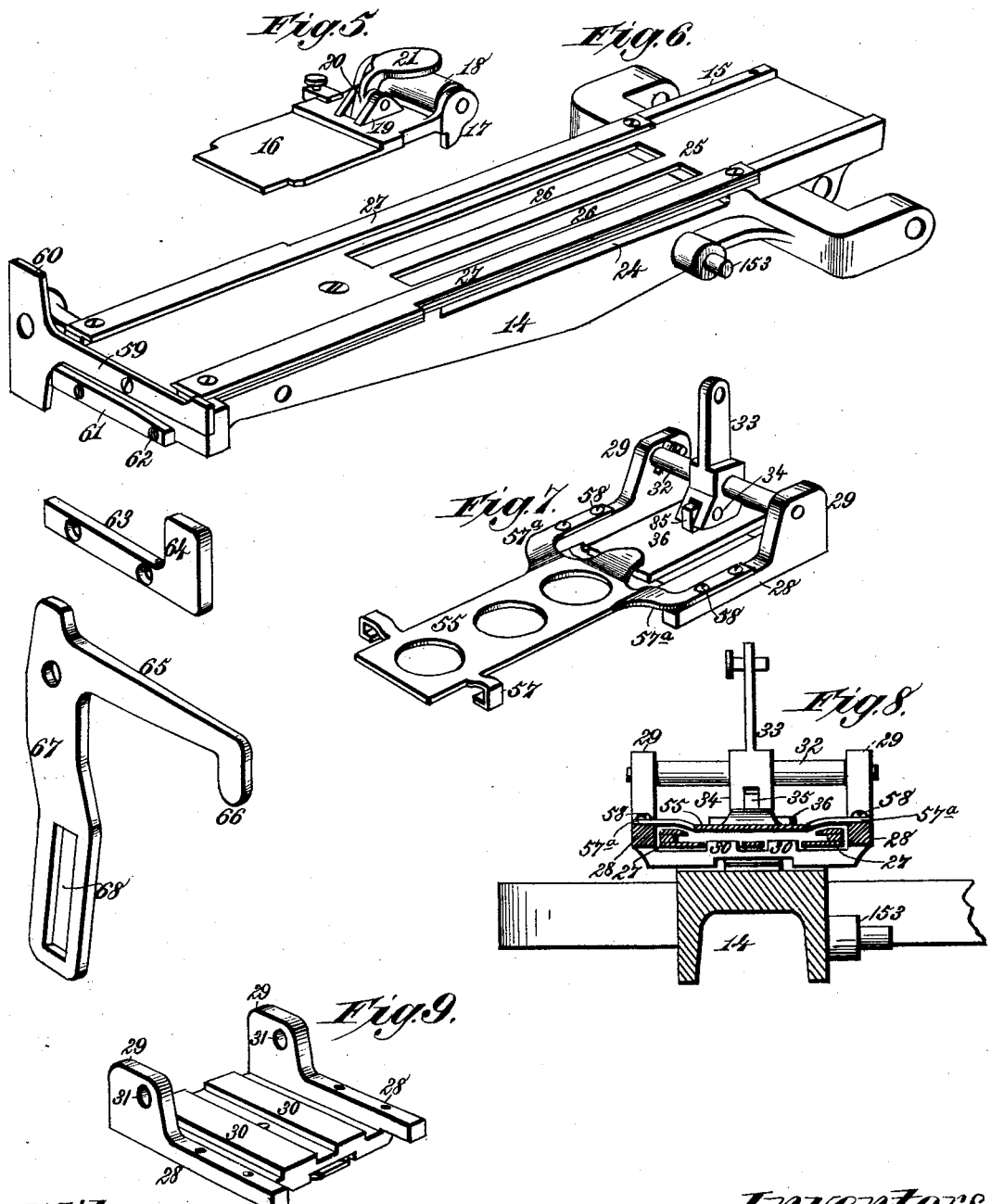

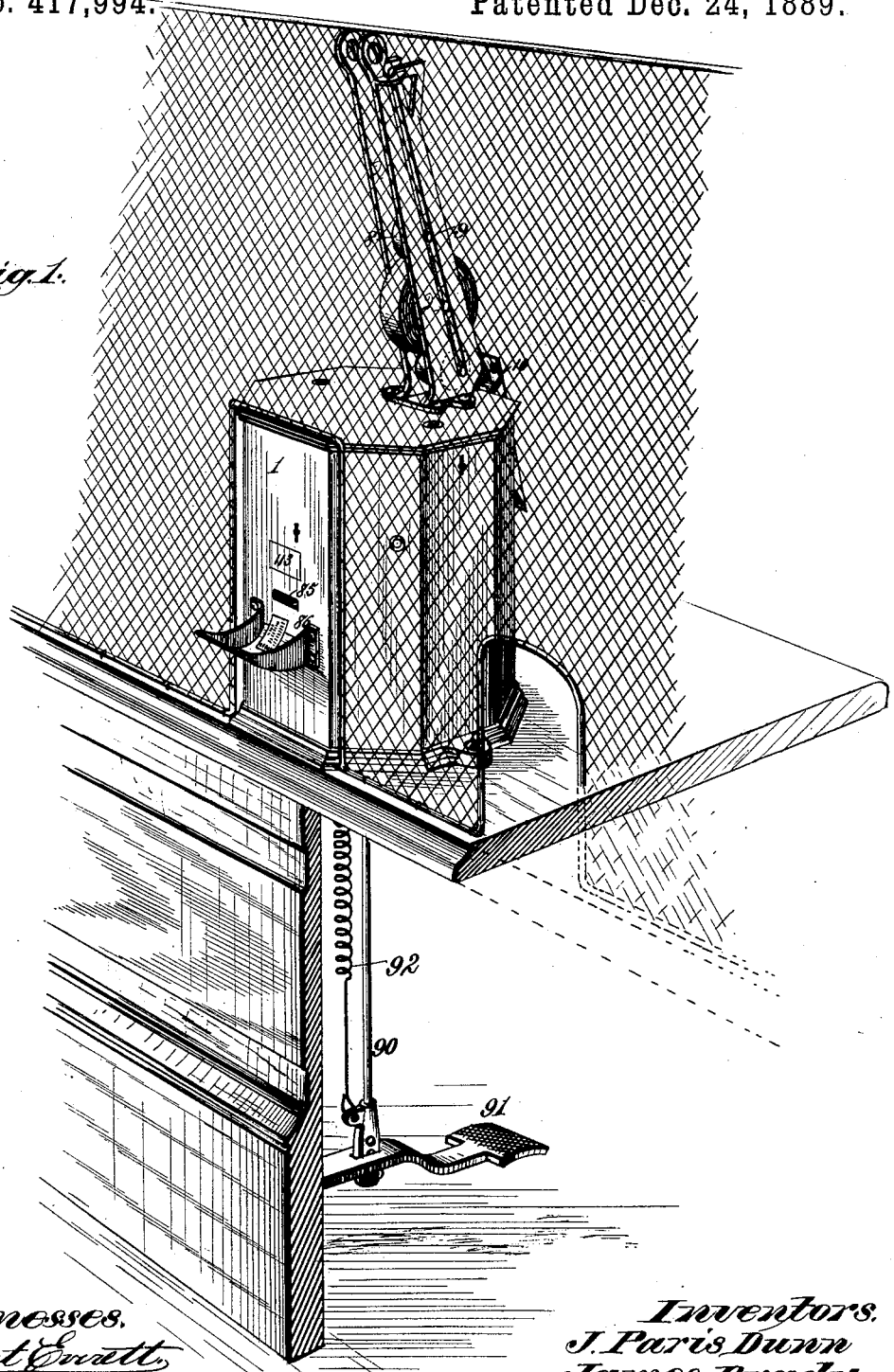

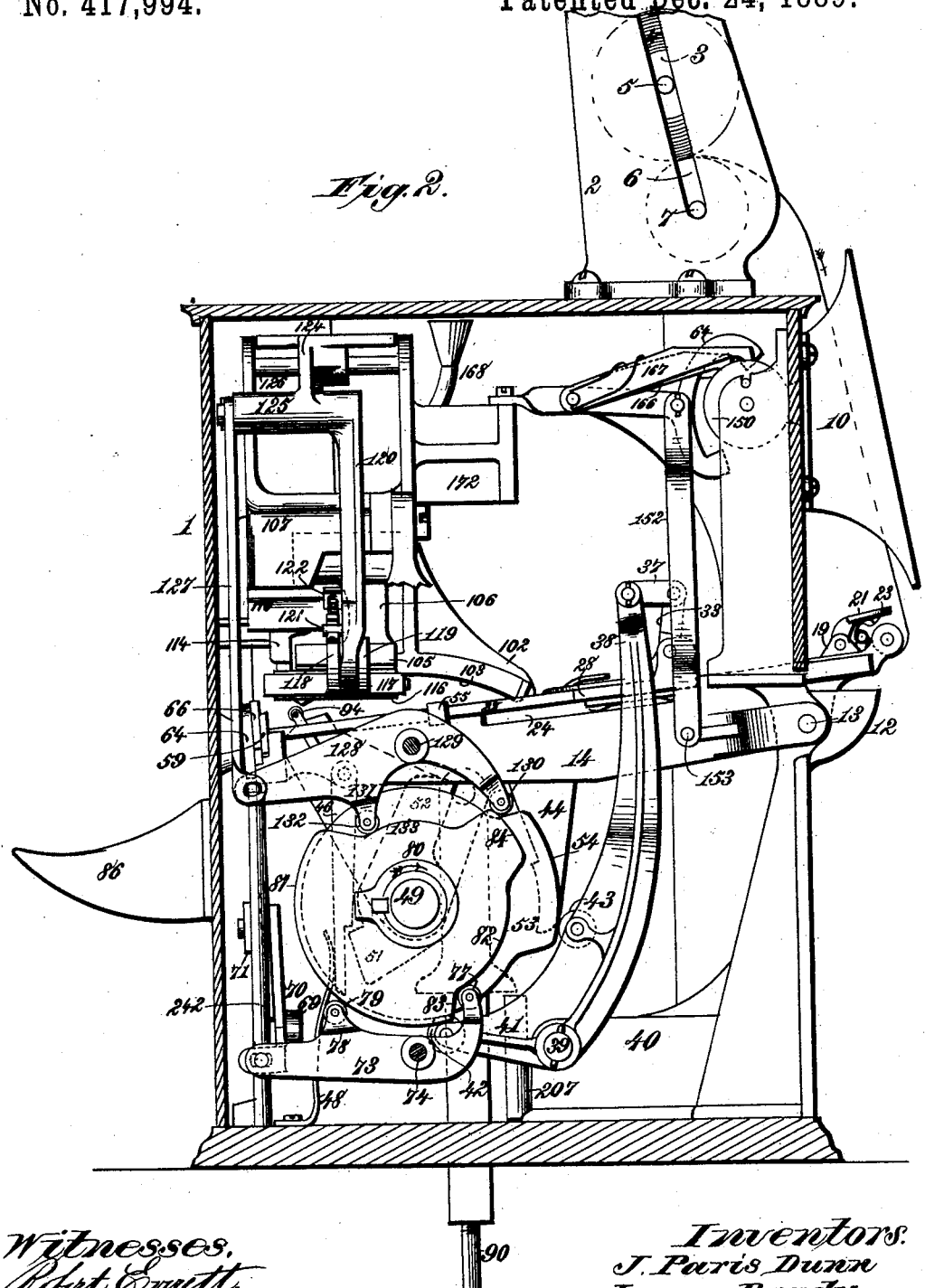

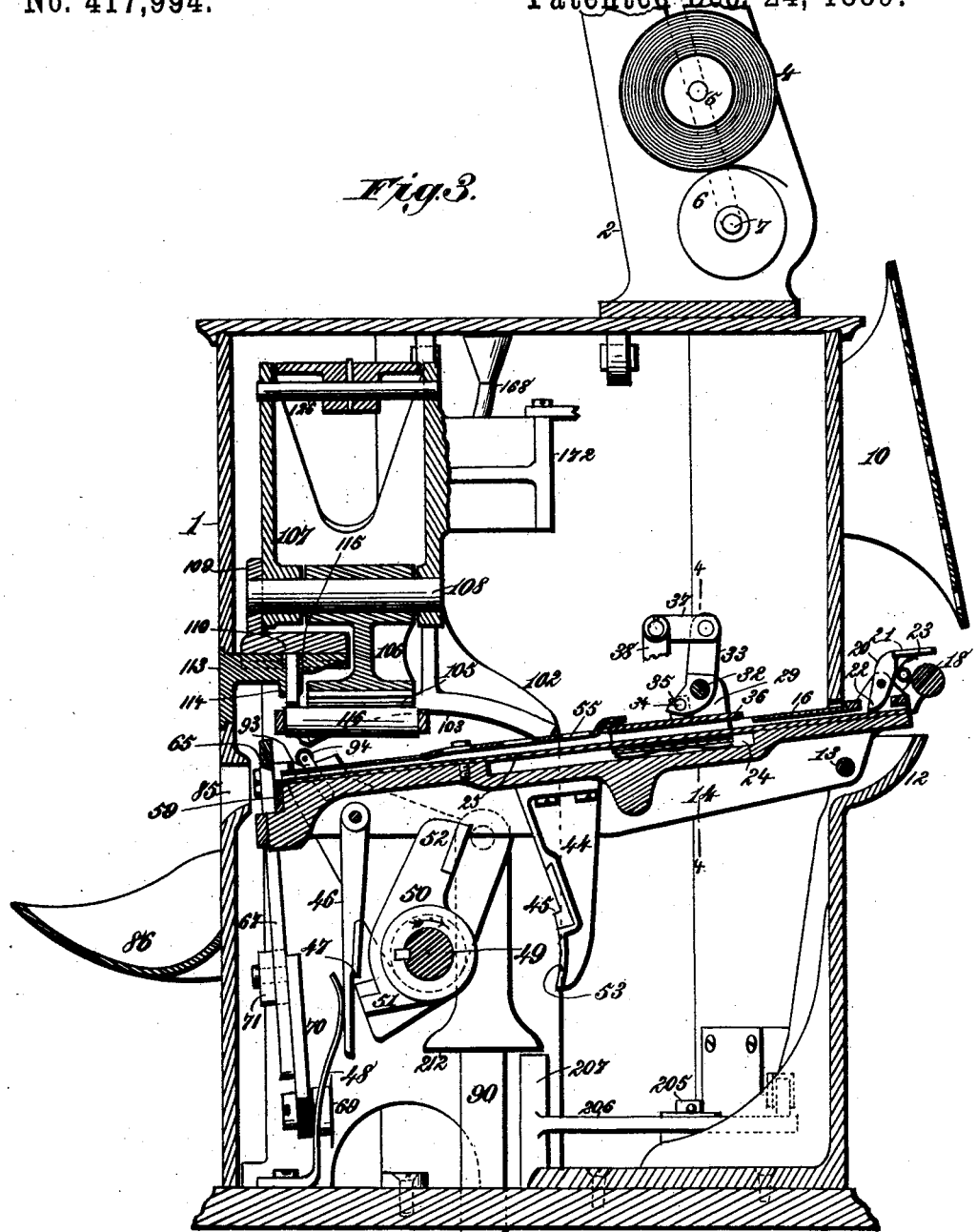

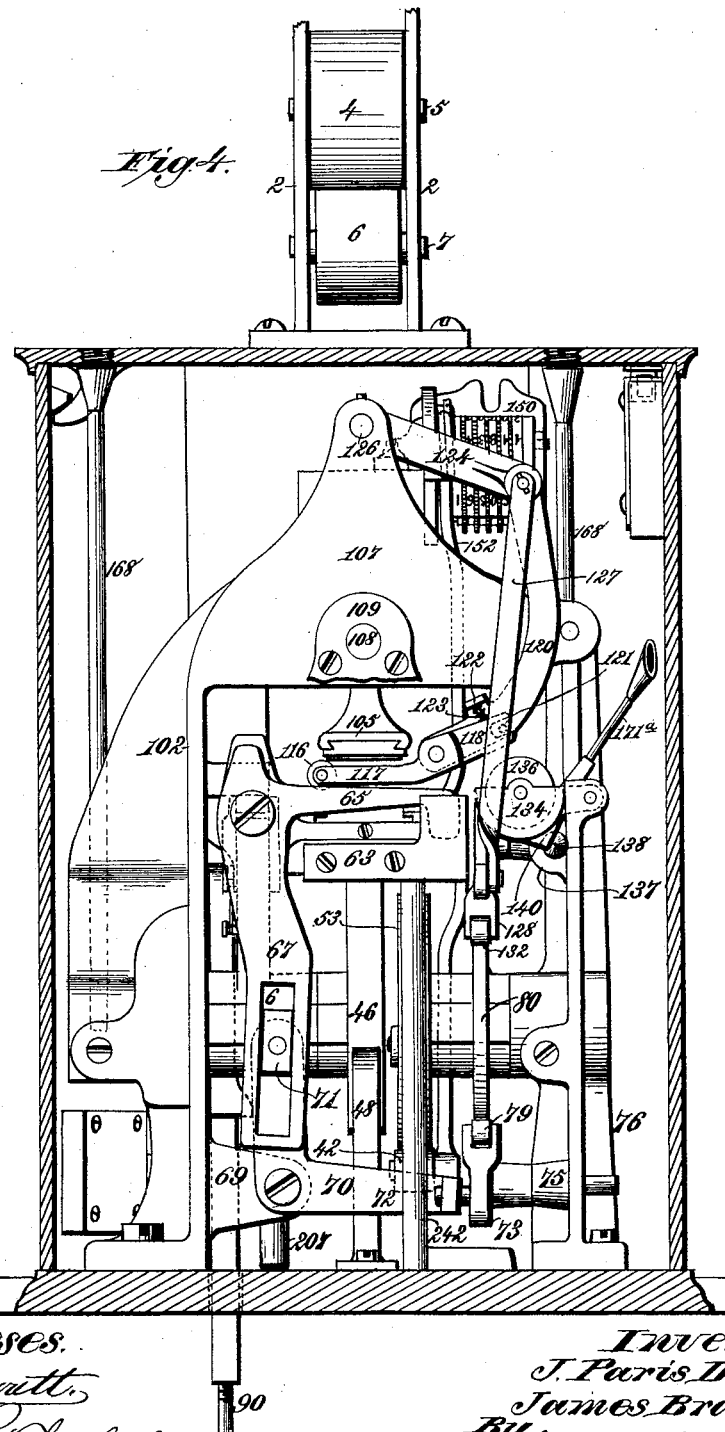

(No Model.) 11 Sheets—Sheet 6.
J. P. DUNN & J. BRADY.
APPARATUS FOR PRINTING, REGISTERING, AND DELIVERING
PASSENGER TRANSPORTATION TICKETS.
No. 417,994. Patented Dec. 24, 1889.
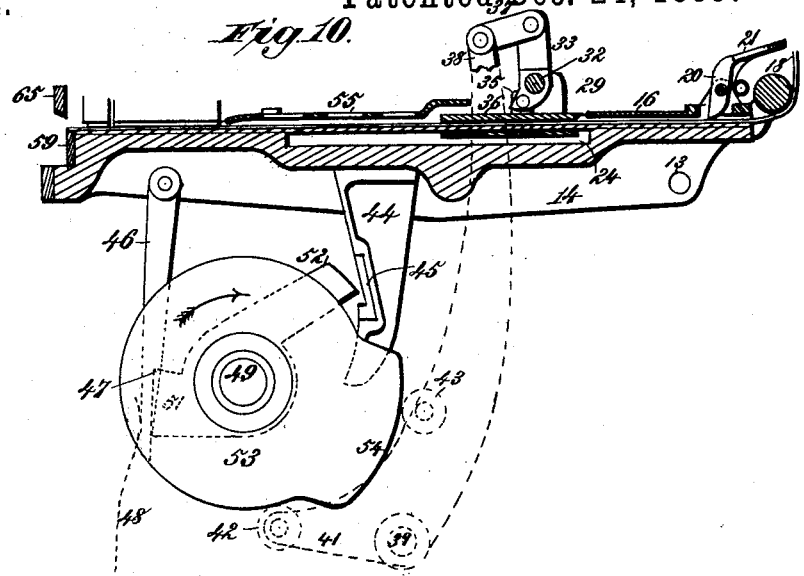
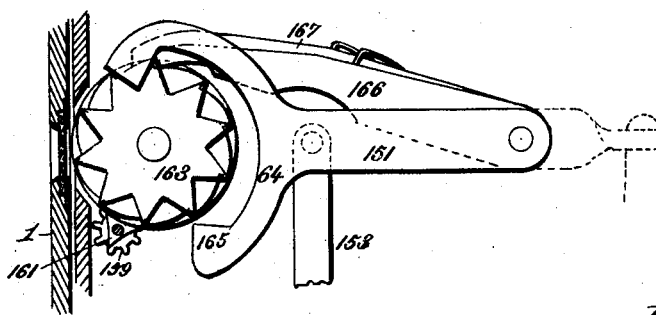
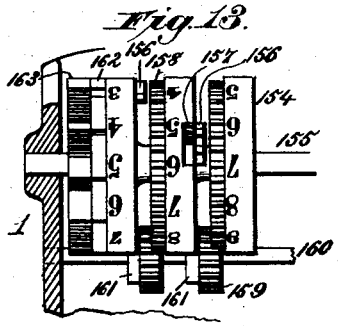
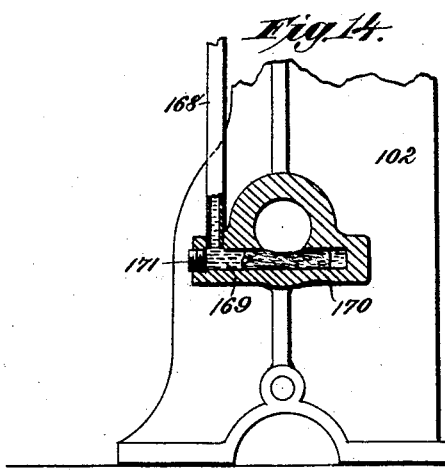
Witnesses. Inventors.
J. Paris Dunn
James Brady
By James L. Norris
Atty (No Model.) 11 Sheets—Sheet 7.
J. P. DUNN & J. BRADY.
APPARATUS FOR PRINTING, REGISTERING, AND DELIVERING PASSENGER TRANSPORTATION TICKETS.
No. 417,994. Patented Dec. 24, 1889.
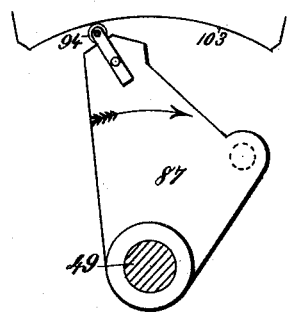
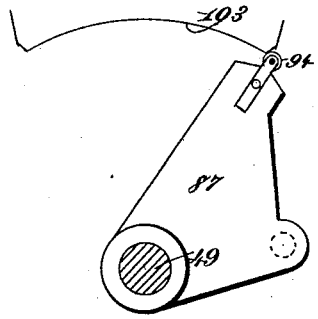
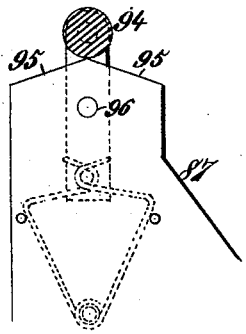
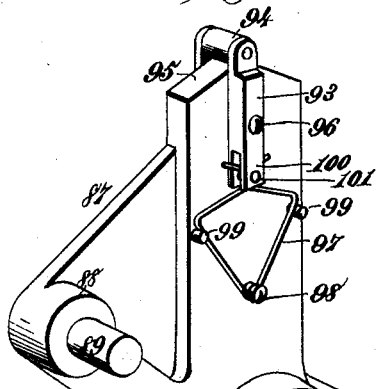
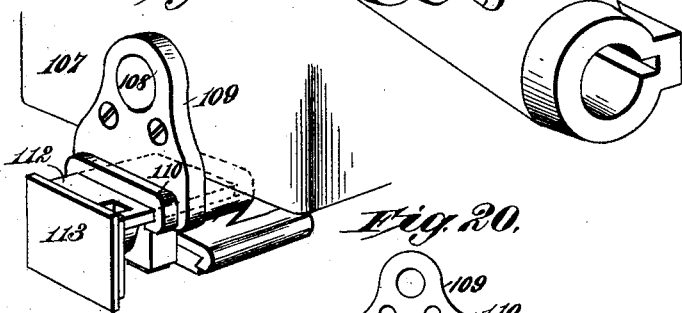
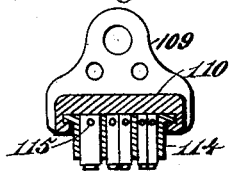
Witnesses.
Robt Pruitt
J. A. Rutherford
Inventors.
J. Paris Dunn
James Brady.
By James L. Norris.
Atty.

(No Model.) 11 Sheets—Sheet 8.
J. P. DUNN & J. BRADY.
APPARATUS FOR PRINTING, REGISTERING, AND DELIVERING
PASSENGER TRANSPORTATION TICKETS.
No. 417,994. Patented Dec. 24, 1889.
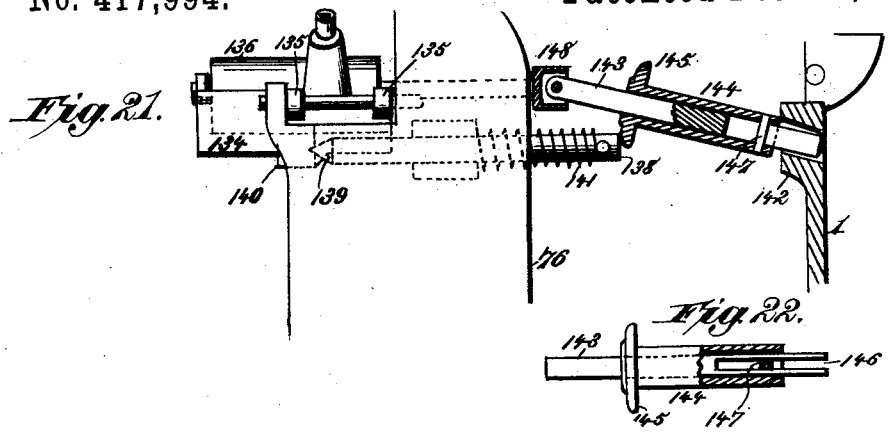
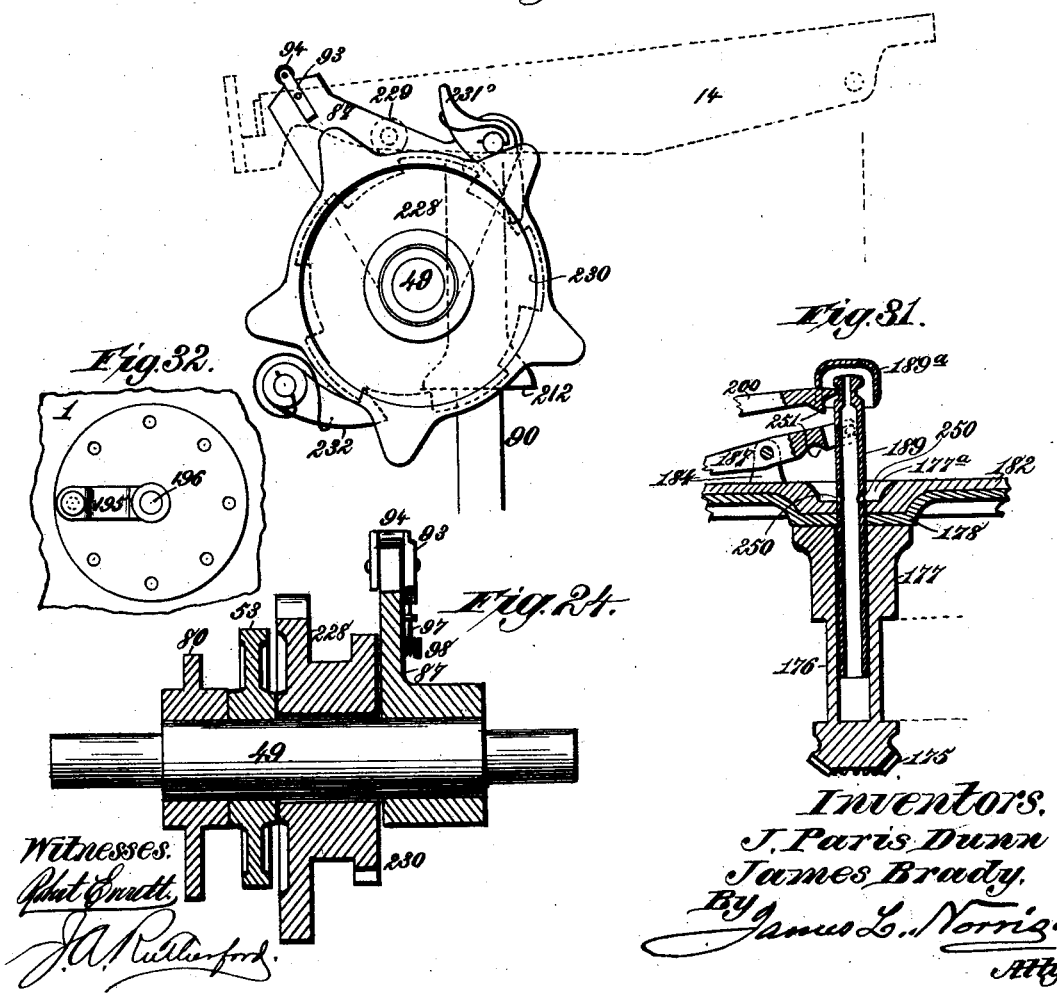
Inventors.
J. Paris Dunn
James Brady,
By James L. Norris.
Atty.
Witnesses.

(No Model.) 11 Sheets—Sheet 9.
J. P. DUNN & J. BRADY.
APPARATUS FOR PRINTING, REGISTERING, AND DELIVERING
PASSENGER TRANSPORTATION TICKETS.
No. 417,994. Patented Dec. 24, 1889.
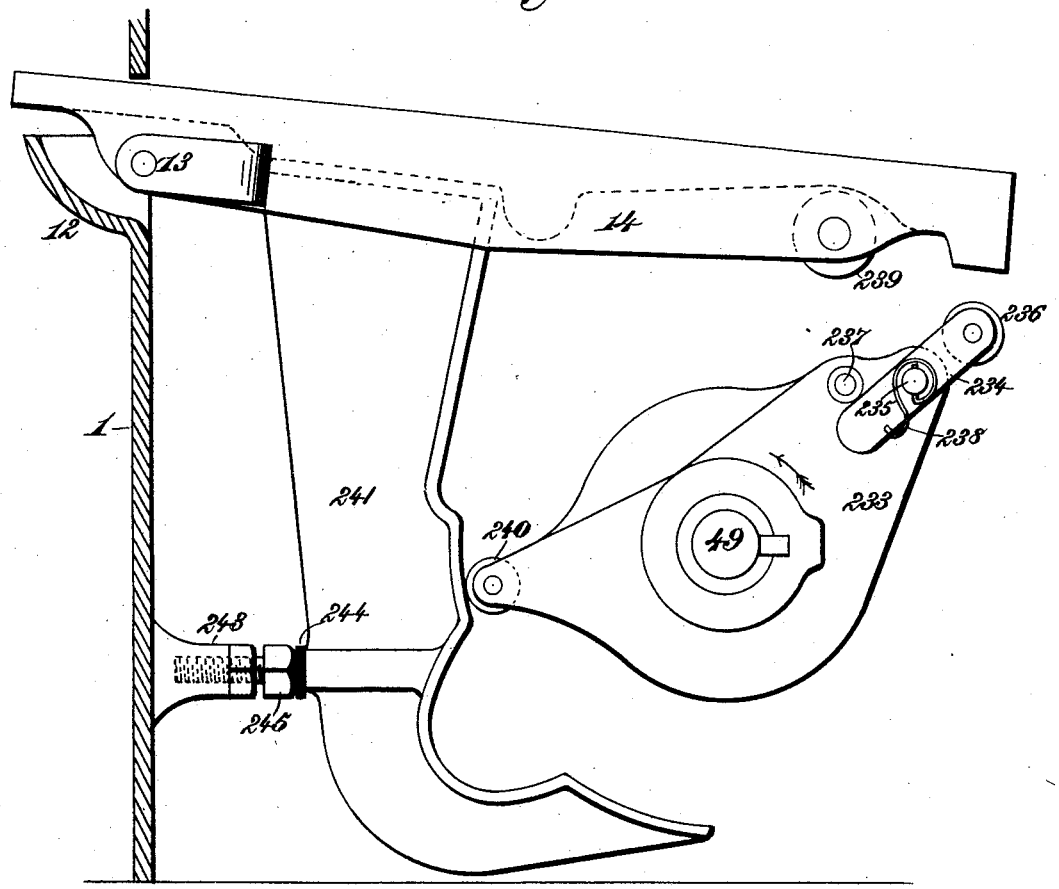

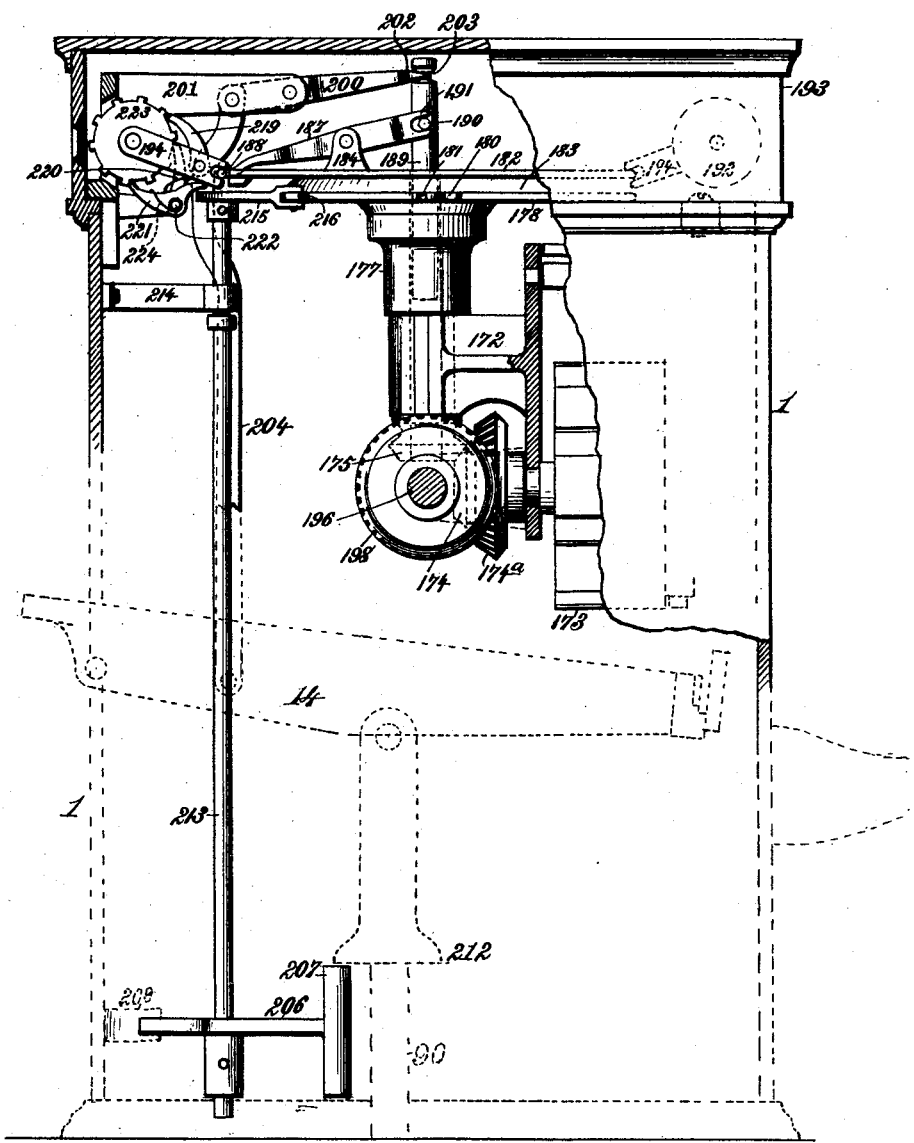

(No Model.) 11 Sheets—Sheet 11.
J. P. DUNN & J. BRADY.
APPARATUS FOR PRINTING, REGISTERING, AND DELIVERING PASSENGER TRANSPORTATION TICKETS.
No. 417,994. Patented Dec. 24, 1889.
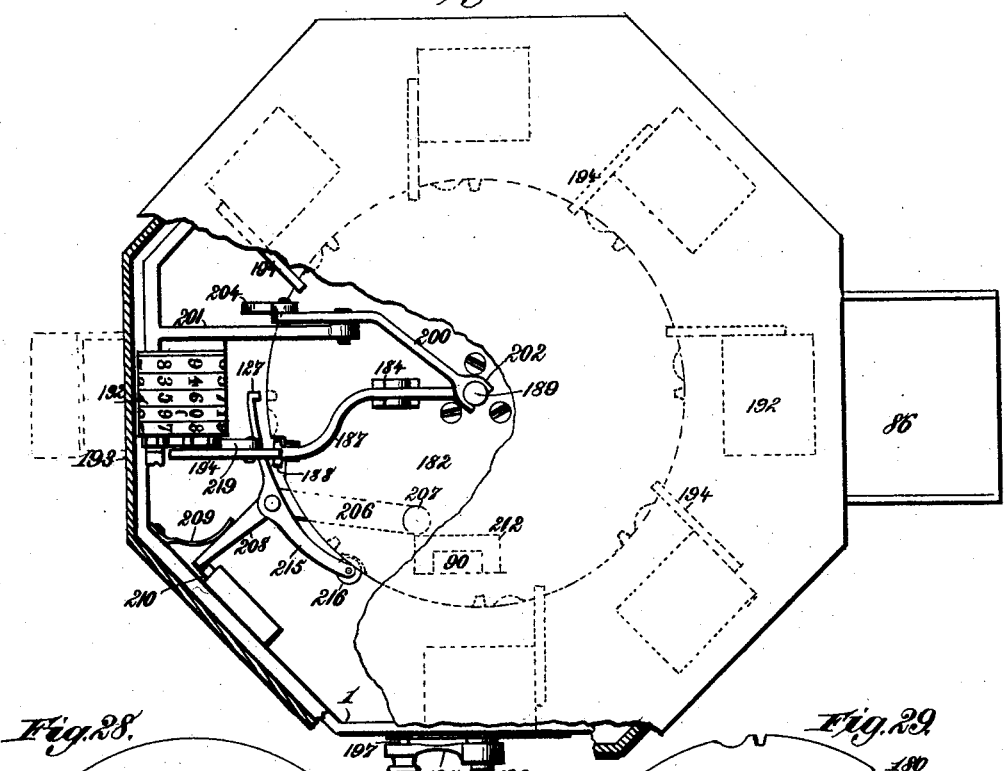
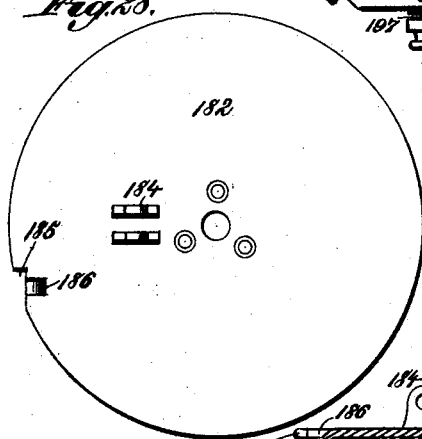
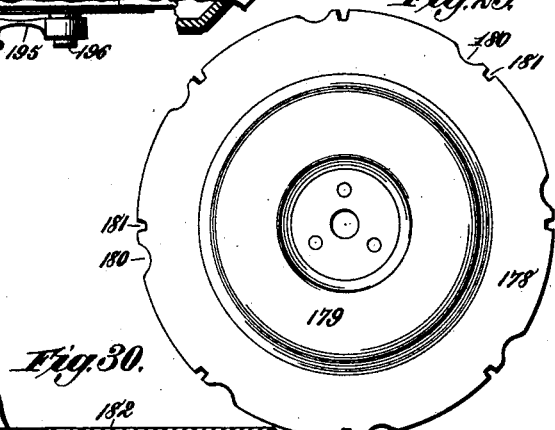
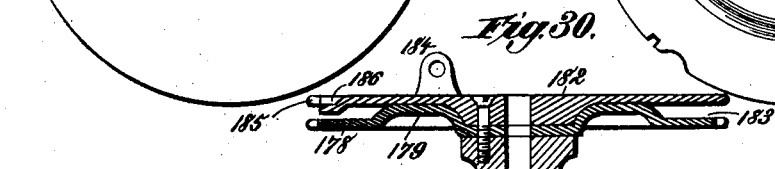
Witnesses.
Inventors.
J. Paris Dunn
James Brady,
By
James L. Norris
Atty.

UNITED STATES PATENT OFFICE.

J. PARIS DUNN, OF NEW YORK, AND JAMES BRADY, OF BROOKLYN, ASSIGNORS, BY MESNE ASSIGNMENTS, TO TIMOTHY MATLACK CHEESMAN, OF NEW YORK, N. Y.

APPARATUS FOR PRINTING, REGISTERING, AND DELIVERING PASSENGER TRANSPORTATION-TICKETS.

SPECIFICATION forming part of Letters Patent No. 417,994, dated December 24, 1889.

Application filed April 23, 1888. Serial No. 271,557. (No model.)

*To all whom it may concern:*

Be it known that we, J. PARIS DUNN, residing at New York, in the county of New York and State of New York, and JAMES BRADY, residing at Brooklyn, in the county of Kings and State of New York, citizens of the United States, have invented new and useful Improvements in Apparatus for Printing, Registering, and Delivering Passenger Transportation-Tickets, of which the following is a specification.

Our invention relates to mechanism for printing passenger transportation-tickets with a proper date affixed and delivering the same to the purchaser, each sale being recorded by a suitable registering apparatus.

It is our purpose to provide a mechanism having positive action throughout for feeding a continuous ticket-strip, printing any suitable ticket impression thereon, dating the printed ticket, detaching the same for delivery to the purchaser, and registering the sale thereof, the entire series of operative parts being inclosed within a locked casing, where they are wholly inaccessible.

It is our purpose to so organize said mechanism that the successive steps of feeding, printing, detaching, or severing the ticket and registering the sale thereof shall be accomplished by the single stroke in one direction of an actuating-lever, the latter being inoperative upon its return-stroke or recovery, and whereby, also, the actuating-stroke of the lever must be fully completed before the ticket can be delivered or obtained and before the mechanism can be a second time operated, thus insuring complete and perfect action at movement, insuring the perfect formation, detachment, delivery, and registration of each ticket, compelling the operator to carry the stroke far enough to register a single sale at each single stroke of the operating-lever, preventing all tampering with the machine, and instantly detecting an attempt to do so.

It is our purpose to provide mechanism of this class with novel means for moving a vibrating platen toward the type-holder to effect the successive impressions, which platen falls to permit the feed of the ticket-strip, the projection from the casing of the completed ticket, and its detachment and delivery.

It is our purpose to combine with the vibrating platen a sliding feed having positive action in both directions; to provide the same with an automatic friction-clamp and with means for avoiding displacement and buckling of the ticket-strip; to connect the registering apparatus with the platen and operate the former by the vibration of the latter; to combine with the platen a knife located at the exit end of the platen, and to combine with said knife positive means for actuating the same at the proper moment when the printed end of the ticket-strip is projected from the casing ready for detachment.

It is our purpose to provide mechanism of this type with facilities for oiling the bearings of the parts without giving access to the inclosing-casing, and to provide means for supplying ink to the inking-roller and the ink-fountain and rotating the fountain-roller, when brought into contact with the inking-roller, without entering said casing; to provide for the introduction and removal of the type-forms for the daily change of the dating-stamp, whereby the latter may be removed and a new stamp inserted to co-operate with the printing-form without disturbing the latter.

It is our purpose to provide novel means for actuating the registering apparatus, whereby movement is communicated from a vibrating part of the mechanism to the unit-disk in two equal steps—one upon the direct stroke and the other upon the return-stroke of the actuating-lever—the sum of the two movements being a single shift of the register; to combine with the several wheels or disks of the registering-train novel means for imparting movement from one wheel to the next in order at proper intervals, and for preventing movement at other times, and to provide a system of alternating pawls, whereby the operation of the registering-train shall be rendered more certain and exact.

It is our purpose to so organize the mechanism of a ticket printing and registering apparatus that it shall be impossible to operate the same to print a ticket without also actuating the registering-train, whereby all attempts at fraud shall be effectually prevented.

It is our purpose, also, to provide such construction and arrangement of parts that when not in positive action the type-surface shall be shielded by part of the inking mechanism, which is only withdrawn as the platen carrying the ticket-strip rises toward the type-holder and initiates a stroke of the operating-lever, which must be carried far enough to effect registration before the lever can return to normal position, whereby attempts to print by lifting the ticket-strip by means other than the vibrating platen will be frustrated.

It is our further purpose to provide for the printing of a series of tickets of different prices and the registration of the tickets of the same price upon the same registering-train; to provide simple means whereby the train-levers of the registers shall be locked against movement save when they are engaged with the shifting actuating-lever; to combine with the multiple type-holder and with the devices adjusting the same means whereby the action of the machine shall be obstructed until such time as the type-surface is in proper position to make a true impression, and to utilize the devices by which this result is effected to securely lock all parts of the interior mechanism during such time as the machine is not in actual operation.

The invention consists in the several novel features of construction and new combinations of parts hereinafter fully described, and then definitely pointed out in the claims.

In the accompanying drawings, Figure 1 is a general perspective view showing the mechanism inclosed, with the several parts accessory thereto. Fig. 2 is a side elevation of the interior mechanism, the casing being in section and part of the interior supporting-frame being broken away. Fig. 3 is a central vertical section, the section plane being parallel with the plane of projection in Fig. 2. Fig. 4 is a front elevation, the casing being in section. Fig. 5 is a detail perspective of the guard-plate, with the check-pawl and guide-roll thereon. Fig. 6 is a detail perspective of the vibrating platen, the knife-guide, and shear-blade, the parts being somewhat separated, but shown in proper relative position. Fig. 7 is a detail perspective of the feed-carriage, friction-clamp, and guard-plate. Fig. 8 is a vertical sectional view in detail on the line 4 4, Fig. 3. Fig. 9 is a detail perspective of part of the feed-carriage detached. Fig. 10 is a vertical longitudinal section of the vibrating platen in a raised position, with its immediate adjuncts, the devices actuating said platen, and the means for reciprocating the feed-carriage. Fig. 11 is a detail end elevation of the registering-train, the escapement-lever operating the same, and the system of holding-pawls. Fig. 12 is a detail section taken between any two of the registering-wheels. Fig. 13 is an edge elevation of a portion of the wheels of the registering series. Fig. 14 is a detail section showing the construction of the oil-chambers and the means for supplying oil thereto. Fig. 15 is a diagram showing the stroke-check in the act of operating. Fig. 16 is a similar diagram showing the stroke-check at the end of its operative stroke. Fig. 17 is a side elevation of the stroke-check plate, showing the centering-springs. Fig. 18 is a detail perspective of the stroke-check plate, with its check-yoke and centering-springs. Fig. 19 is a perspective of the part of the frame carrying the type holder or form, showing the means for supporting the dating-stamp. Fig. 20 is a detail section of the dating-stamp and the guide-bracket supporting the same. Fig. 21 is a detail elevation, partly in section, showing the means for raising the ink-fountain and for inking the type-inking roller. Fig. 22 is a detail section of the fount-raising sleeve and its shaft detached. Fig. 23 is a detail elevation showing modified means for lifting the vibrating platen. Fig. 24 is a vertical section, taken in the axial line of the shaft, of the star-wheel in Fig. 23. Fig. 25 is a side elevation showing a further modification of the devices for vibrating the platen. Fig. 26 is a side elevation showing the parts for printing and registering tickets of different prices, the casing being shown partly in section. Fig. 27 is a plan view of Fig. 26, the casing being partly broken away. Fig. 28 is a detail plan view of the upper disk or register-lock. Fig. 29 is a detail plan view of the lower disk of the same. Fig. 30 is a central vertical section of the register-lock and its actuating-gear, showing the multiple form-carrier in elevation. Fig. 31 is a detail section showing a modified form of oiling apparatus, and Fig. 32 a detail view of the crank for adjusting the multiple form-carrier.

In the following description the order of operation of the several parts composing the mechanism will be followed as closely as the requirements of the specification will permit, each element being described in the order in which it acts upon the ticket-strip in the formation, detachment, and registration of each ticket sold, with its proper function, construction, and its combination with other parts.

In the said drawings, the reference-numeral 1 designates the casing of the machine, which may be of any desired form, though it is shown herein as being octagonal in plan view. Upon this casing is mounted a bracket, consisting of two parallel vertical or slightly-inclined arms 2, in which the roll from which the ticket-strip is taken is mounted. The parallel arms 2, composing the supporting-bracket, are provided with longitudinal slots 3, extending the greater part of the length of said arms and opening at their top to admit the journals of the axis of each roll and to permit the steadily-diminishing roll to descend in the space between the parallel arms as its diameter decreases. The ticket-strip is wound in a roll 4 of any suitable size and mounted upon an axis having projecting journals 5, which lie in the slots 3 of the bracket-arms 2 and descend therein as the roll grows smaller by consumption of the strip. Beneath the roll 4 is mounted a riding-roll 6 upon a shaft having its journals 7 in the lower ends of the slots 3, whereby the periphery of the strip-roll 4 may rest upon said riding-roll. Above the strip-roll 4 an idler-roll 8 of suitable weight is introduced, having its journals 9 lying in the slots 3 of the parallel bracket-arms 2 and descending in the slots 3 by its own gravity, thereby maintaining constant contact with the upper surface of the strip-roll and forcing said roll against the riding-roll, which the strip-roll turns. The ticket-strip being taken from the under side of the strip-roll 4 and from between the same and the riding-roll, it will be seen that an effectual safeguard is provided against the accidental pay-off of the strip by undue momentum of the roll as well as against the accidental loosening of the spiral strip upon the roll, the gravity or idler roll 8 serving as a brake upon the ticket-strip and co-operating in that respect with the idler-roll upon which the ticket or strip roll 4 rests. Inasmuch, however, as these parts form no portion of our present invention and are covered by a separate and sole application, they are described herein only as a part of the mechanism shown, but do not enter into the claims presented herewith.

From the strip-roll 4 the ticket-strip passes downward behind a hood 10, which preserves it from displacement. In the rear wall of the casing 1 is formed an opening partly shielded by an underlying cowl 12, and in said opening is mounted upon a pivotal axis 13 a vibrating platen 14, the rearward end of which projects through the opening in the casing.

Upon the rearward end of the platen, which is channeled to form low marginal guides 15, is laid a guard-plate 16, Fig. 5, having its edges resting upon the marginal guides 15, and provided with lugs 17 at its outer end, which not only abut against the end of the platen and retain the plate in place, but provide a journal-support for the shaft of a guide-roll 18, under which the ticket-strip passes, and from which said strip is led beneath the plate 16 and between the latter and the raised marginal portions 15. Upon the guide-plate 16, just in front of the guide-roll 18, are formed lugs 19, between which is mounted a check-pawl 20, having its flat end 21 bent over toward parallelism with the rearward extremity of the platen. The nose 22 of this check-lever has bearing upon the ticket-strip, as seen in Fig. 3, and is held in engagement therewith by a light spring 23, the travel of the strip into and through the paper-channel of the vibrating platen being unobstructed by the check-pawl, while a retrograde movement of the strip permits the spring 23 to throw the nose of the pawl downward and bind the strip between it and the paper-channel.

Proceeding from the rearward end of the paper-platen the channel therein is in front of the guide-plate 16 countersunk, forming a recess 24, extending over a considerable portion of the length of the platen. Overlying this recess and having its surface flush with the surface of the paper-channel is a plate 25, having longitudinal slots 26. Mounted upon the marginal portions 15 are overhanging guard-flanges 27, which extend from the rearward end of the plate 25 to the exit extremities of the platen, the forward end of the guide-plate 16 being notched to lie between the ends of these flanges. Lying in the countersunk recess 24 is a feed-carriage having side bars 28, which lie outside the margins of the platen and are provided with lugs 29. The body of the carriage is provided with ribs 30, which lie in the slots 26 and have their surfaces flush with, or it may be a little above, the surfaces of the plate 25 upon each side of the slots 26.

In suitable bearings 31 in the lugs 29 is mounted a rock-shaft 32, upon which is rigidly mounted a lever 33, having a forked end 34. In this forked end is pivotally mounted a lug 35, forming part of a friction clamp or plate 36, which overlies the carriage-ribs 30. The construction described (see Figs. 5, 6, 7, and 8) is such that the feed-carriage may slide backward and forward in the countersunk recess 24 from end to end of the same.

Connected with the upper end of the lever 33 is a link 37, to which is pivotally connected a feed-lever 38, having its fulcrum upon a pivotal axis 39, the latter having support in a bracket-casting 40. The upper end of said lever is curved over the platen and attached to the link 37, while the lower end has an angular portion 41, at the extremity of which is a friction-roll 42. A second and similar roll 43 is mounted upon the lever upon the other side of the fulcrum and at about the same distance therefrom.

Rigidly mounted upon and depending from the under surface of the platen 14 is a bracket 44, having a face which is concave toward the forward or exit end of the platen. In this concave face is formed a pocket 45, formed, preferably, of hardened metal. (See Fig. 10.) Near the forward end of the platen, and likewise depending from its under surface, is a swinging or pivotally-mounted lift-bar 46, also provided with a pocket 47, similar to the pocket 45 in a bracket 44, save that in the latter the bottom or wider part of said pocket is below and in the former above its narrower portion. A leaf-spring 48 impels the swinging lift-bar 46 toward the rearward end of said platen.

Between the swinging bar 46 and the bracket 44 is placed the rock-shaft 49, from which the entire motive power is derived. Upon this shaft is rigidly mounted or keyed the vibrator 50, having a square head 51 and an arm 52. The vibration of the shaft being for the active stroke in the direction of the arrow in Fig. 10, the square head 51 of the vibrator will first engage the pocket 47 in the bar 46, raising the bar 14 until the circular movement of the square head 51 draws it out of the pocket 47, the lower angle of the head assisting therein by forcing the bar slightly forward against the tension of the spring 48. At the moment this disengagement is effected, or an instant afterward, the arm 52 engages with the bottom of the pocket 45 in the bracket 44 and restores the platen to its normal position. As the platen falls, turning upon its axis 13, the arm 52 is withdrawn from the pocket 45 and passes off down in a curve 53 below the pocket 45. By means of the devices hereinafter described the rock-shaft 49 is returned to its normal position after each effective stroke.

Mounted upon the axially oscillating or rocking shaft 49 is the feed-cam, consisting of a disk struck on a true circle from the axis of shaft 49, but having a segment 54 of greater radius, which actuates the feed-lever 38. This cam is timed to act upon the feed-lever an instant after the platen 14 has dropped by gravity to its lowest normal position, or has been restored to such position by the positive action of the arm 52 of the vibrator. At the time mentioned the segment-cam 54 engages with the friction-roll 42 on the end of the angular portion 41 of the feed-lever and throws the free end of said lever toward the exit end of the platen. Inasmuch as the preceding vibration of the pivoted platen has carried the axis of the rock-shaft 32 slightly toward the pivotal or entrance end of said platen, thereby causing said shaft to turn somewhat in its bearings and depress the friction clamp-plate 36, thereby locking the ticket-strip between said plate and the ribs 30 of the feed-carriage, the action of the cam-segment 54 throws the connected end of said lever toward the exit end of the platen 14, thereby sliding the feed-carriage from the rearward toward the front end of the countersunk recess 24. The ticket-strip being securely clamped between the plate 36 and the feed-carriage, it is drawn off the roll and advanced in the paper-channel by a distance equal to the length of strip required for the printing of an ordinary ticket.

In order to prevent the paper strip from buckling, we mount upon the marginal flanges 27, just in advance of the feed-carriage, a guard-plate 55, having clasps 57, which embrace the flanges 27 and slide freely thereon. The rearward end of said guard-plate is connected to the feed-carriage by means of curved arms 57$^a$, resting upon the marginal parts 28 and fastened thereto by screws 58.

By the construction and organization of parts thus far described it will be seen that at or about at the instant the vibrating platen falls from the type-holder or type-form the actuating cam-segment strikes the roll 42 on the feed-lever, causing a quick vibration of the same, by which the feed-carriage is shot to the end of its stroke. As the roll 42 rides upon the cam the roll 43 rides off at the other end of the cam-segment. In a similar manner, when the cam vibrates back to its normal position, the roll 42 passes off the cam as the roll 43 rides on, the movement of the feed-lever being thus made positive in both directions.

Upon the exit extremity of the platen 14 is rigidly mounted the stationary knife-blade 59, having a guide-plate 60 at one end, the edge of the knife being in the plane of the surface of the paper-channel, or thereabout. Beneath the rigid blade 59 is formed an offset piece or bar 61, having its outer face projecting beyond the plane of the face of the blade 59 and provided with threaded apertures 62. Upon the offset block 61 is rigidly mounted a bar 63, having an L-shaped upwardly-projecting end 64, rising above the end of the blade 59. Upon the guide-blade 60 is pivotally mounted the movable shear-blade 65, having a nib 66, which engages with the inner face of the end 64 of the bar 63 to hold the movable blade against the stationary blade throughout the entire cut. The actuating-shank 67 of the movable shear-blade depends below the pivotal point at a right angle to the blade, or substantially so, and is provided with a longitudinal slot 68, for a purpose presently to be shown.

Fulcrumed upon a bracket 69, forming part of the frame carrying the type-form, is a bell-crank or elbow lever 70, having upon one end a swiveled block 71, which lies in the slot 68 of the knife-shank and moves freely therein, Fig. 4. The other arm 72 of the lever is carried toward the right, and its extremity is bent in a horizontal plane at right angles to the said arm to permit its pivotal attachment to the knife-actuating lever 73. This lever consists of a plate having its fulcrum upon a pivot-pin 74, supported in a boss 75, which projects from the upright portion 76 of the interior frame. The power end of the lever 73 is curved upward and forked, and within the fork is journaled a friction-roll 77, while upon the other side of the fulcrum a lug or bracket 78 is formed upon the lever and similarly provided with a friction-roll 79. The knife is operated by the devices now to be described.

Upon the motor-shaft 49 is keyed a cam 80, having an arc or segment 81, which is struck upon a true circle from the axis of the shaft, and a similar arc 82, also formed upon a concentric curve, but with a less radius, the arcs 81 and 82 being separated by the cam-shoulder 83. At the extreme end of the lesser arc 82 is a cam-segment 84. These parts—that is to say, the segments 81 and 84, with the intermediate arc 82—are so timed with relation to the vibrator 50 and the feed-cam 53, actuating the feed-lever 38, that the cam-segment 54 shall have engaged with and operated the feed-lever 38 before the cam-segment 81 makes engagement with the friction-roll 77, whereby the progressive movement of the ticket-strip is fully completed and the ticket-strip brought to rest relatively to the platen 14 before the shears begin to act. The feed movement being completed, however, and this movement following the rise of the platen, whereby the ticket-strip is brought into engagement with the type-form, the further revolution of the rock-shaft 49 brings the cam-segment 84 into engagement with the roll 77 upon the power end of the lever 73. As the latter engagement takes place, the lever is suddenly vibrated upon its fulcrum 74, raising the end to which the bent extremity of the bell-crank 70 is pivoted and rocking or vibrating the upright arm of said bell-crank toward the left of Fig. 4, thereby swinging the depending shank 67 of the knife-blade 65 and producing a shearing cut, the shearing-edges of the blades being held in contact or operative engagement by means of the nib 66 of the movable blade engaging with and moving against the inner face of the bracket-guide 64 on the bar 63. This action separates the printed ticket from the continuous ticket-strip, and said ticket having been projected through a slot or opening 85 in the casing 1 by the preceding feed movement of the strip, which movement follows instantly upon the printing impression, the ticket thereby completed and projected through the slot 85 is cut from the ticket-strip and dropped into a hopper 86 upon the outer wall of the casing, whence it is taken by the purchaser.

As each ticket, after being printed and dated, is severed from the ticket-strip, it is registered by the mechanism hereinafter described. Before setting forth the registering apparatus, however, we will describe, first, the means whereby the feed of the ticket-strip, the imprint of the ticket, and its detachment are all effected by the downward stroke of the actuating-lever.

As already described, the mechanism contained within the casing 1 is actuated from the single motor-shaft 49. Upon this shaft is keyed (see Fig. 18) a stroke-plate 87, having substantially a triangular form, the vertex of the least angle being the axis of the motor-shaft. At or near the vertex of the angle formed by the base and shorter leg of the triangle is formed a boss 88, having a journal-pin 89, to which is connected a link-bar 90, Figs. 1 and 3, the other end of said bar being attached to a pedal-lever 91, having any suitable pivotal support. This pedal is so arranged, Fig. 1, as to be within easy reach of the operator, and after each stroke it is returned to place for the ensuing stroke by means of a strong spring 92. The stroke-plate 87 being splined upon the shaft, the movement imparted to it is communicated to the cams already described, which are mounted upon the same shaft, said cams being those which operate the feed-lever 38 and the shearing-lever 73, the rotary reciprocation of the shaft 49 being for the effective stroke in the direction of the arrow in Figs. 2, 3, and 10, the recovery of the parts being effected by the action of the spring 92.

Upon the stroke-plate 87 is pivotally mounted a check-yoke 93, having a check-roll 94 journaled in the end of the yoke; and moving over the beveled projecting end 95 of the stroke-plate. The axis of the yoke being at the point 96, the yoke is at liberty to vibrate upon each side of the vertex of the double bevel 95. It is normally centered upon said vertex by a spring 97, centrally coiled upon a pin 98, thence diverging toward each side and upward, forming a V-shaped portion, which rests upon each side against stop-pins 99. From these points the ends of the spring are carried beneath a fork 100 in the depending end of the yoke and bent past each other and beneath a cross-pin 101, and are then partly hooked around said pin, Fig. 17. By this construction the vibration of the yoke will coil the spiral upon the pin 98, and when released the roll and yoke will snap back to the center until the arm of the spring rests against the stop-pin 99, whereby the roll will, when not otherwise acted upon, always stand centrally relatively to the beveled end of the stroke-plate.

Formed upon the upright frame or casting 102 is an arch 103, lying directly above the stroke-plate and roll 94 and concentric with the axis of the shaft 49. This arch (shown in diagram in Figs. 15 and 16) is brought down within such proximity to the beveled end 95 of the stroke-plate that in order to sweep said plate through the arc comprised by its effective stroke and then back the yoke 93 must vibrate to one side and the other of the vertex of the double bevel, as shown in Fig. 15. If now the stroke-plate is arrested at any point short of a complete stroke and a retrograde movement attempted, the check-roll 94 will be thrown toward the vertex of the double bevel 95, binding upon the arch 103 and preventing the return movement of the stroke-plate. At each end of the arch 103 the check-roll, at the completion of each stroke, passes off or out from under the arch, whereby the yoke 93 is permitted to center itself by the action of the spring 97, whereupon as the return-stroke of the plate is initiated the check-roll moves to the opposite side of the vertex of the double bevel. In this manner a complete and perfect operation of the motor-shaft is rendered necessary in order to permit the ensuing stroke to be made, effectually preventing any attempts to operate the mechanism just far enough to print and sever the ticket, but not far enough to register the sale of the ticket.

The type-holder comprises a plate 105, which is supported in any suitable manner upon a bracket 106, depending from an overhanging casting 107 of the frame 102. A convenient method of mounting the form is to simply slide the plate on which it is mounted in a dovetailed channel in the bracket, as in Fig. 4.

The dating-stamp, which requires to be changed daily, consists of the following parts: Referring to Figs. 19 and 20, the numeral 108 denotes a rigid shaft passing through the casting 107, and having its end projecting to receive a bracket-plate 109, carrying a supporting-bar 110, which lies over the type-form. In the bottom of the bracket-plate and of the bar 110 is formed a channel adapted to receive a slide-plate 112, upon the outer end of which is mounted a section 113 of the outer wall of the casing 1. Depending from the plate 112 are three type-pockets 114, in which may be placed the type having proper numerals to denote the number of the month, of the day of the month, and of the year. Cross-pins 115 passed through the type support them against dropping out, and they drop far enough below the slide-plate to bring their type-faces in the proper plane to effect the printing, the dating-stamp being preferably impressed across the end of the ticket.

The type are inked by an inking-roller 116, Fig. 4, journaled in the end of a yoke 117. This yoke has projecting from its central portion an arm 118 and a lug 119 to permit the pivotal attachment of an arm 120. The arm 118 is prolonged and provided with a notch or fork, which receives a pin 121, mounted upon the arm 120. Upon the said arm 120 is formed a laterally-projecting bracket 122, with which a spring 123 engages, pressing against the extended arm 118, and holding the inking-roller up against the type. (See Fig. 4.) The arm 120 is provided with a second rigid arm 124, which is mounted upon a shaft 126 in the upper part of the frame 107. To an arm 125, at the angle between the arms 120 and 124, is pivotally connected the end of a link 127, the lower end thereof being similarly connected to the end of the actuating-lever 128. This lever is of essentially curved form, the power end being bent downward from the fulcrum 129. Upon the end of said lever is a friction-roll 130. Upon the lever on the other side of the fulcrum 129 is a lug or arm 131, also having a friction-roll 132. These rolls rest upon the cam-surfaces 84 and 133, formed upon the cam-plate 80, and are both in contact simultaneously with said surfaces. As the cam is operated, one roll rides up upon one surface as the other roll rides down. By the rise of the arm 131 the link 127 lifts the offset arm 125, turning the arm 124 upon the shaft 126 and sweeping the inking-roller over the type-surface. The recovery of the parts and restoration to place is effected by the double-surface cam acting upon the lever having a contact-arm on each side of the fulcrum, as already described in connection with the knife-lever 73.

The inking-roller is supplied from an ink-fountain 134, which is provided with lugs 135, pivotally connected to the interior frame 76 of the interior of the casing 1. When left to its own gravity, the fountain-cup lies at such a point that the inking-roller at each vibration passes somewhat above the surface of the fountain-roller 136. By raising the fountain-cup upon its pivotal support the two rolls may be brought into contact.

Inasmuch as it is desirable that the inking and all other operations be performed without giving access to the casing, we have provided the following means for such purpose: Resting in a lug 137, which is extended from the casting 76 to form the fulcrum of the lever 128, Fig. 21, and having longitudinal movement therein, is a bar 138, having a conical point 139, which rests against a beveled projection 140 on the rear side of the fountain-cup. The beveled surface of this projection being below the point of pivotal support, it will be seen that by forcing the pin 138 inward between the wall of the frame or casting 76 and the beveled projection on the cup the latter will be raised slightly, this rise being sufficient to bring the inking-roller in contact with the fountain-roller whenever the former is thrown back by the operation of the lever. The bar 138 is withdrawn from engagement by a spring 141. Upon the interior wall of the casing 1 we mount a boss 142, from which a shaft 143 projects inward toward the frame supporting the fountain-cup. Upon this shaft is mounted a sleeve 144, having at its inner end a button or flange 145. The outer end of the shaft 143 projects through the boss 142 and through the casing, and has a slot 146, in which lies a cross-pin 147, driven through the sleeve. When the parts are in their normal position, the button or flange 145 lies in contact with the end of the bar 138, or nearly so. By inserting a flat piece of metal in the slotted end of the shaft until it strikes the cross-pin 147 and then pushing the sleeve inward till the cross-pin reaches the end of the slot the flange 145 will operate the bar 138 and raise the fountain-cup.

The shaft 143 is slightly inclined to bring its inner extremity into the axial line of the fountain-roller 136. Here it is connected to the prolonged end of the shaft of said roller by a universal joint 148. When the cup is raised in the manner already described, the operator actuates the lever sufficiently to retract the inking-roller and bring it into surface contact with the fountain-roller. By simply revolving the flat key inserted in the slotted end of the shaft 143 the fountain-roller may be turned and the inking-roller caused to revolve in contact with it until the latter has received a proper supply of ink. The sale of each ticket is registered by a train of register-wheels 150, of any suitable form, the system of decimal registration being that preferred. The units-wheel of the train is operated by a register-lever 151, said lever having a link 152 connected to an arm 153 on the vibrating platen.

While we may employ any known form of registering mechanism actuated by connection with any one of the movable elements of the mechanism, we propose to use the devices now to be described, whereby greater certainty and security are obtained.

The register-wheels 154 are all loosely mounted on a shaft 155. Each wheel, except the final one, of the series is provided at a certain point upon its periphery with a laterally-projecting flange 156, of sufficient extent to receive two teeth of a gear. Within the peripheral surface of each wheel at a point beside the flange 156 is formed a pocket 157, of angular form, Fig. 12. Upon the vertical face of each wheel, save the initial or units wheel, opposite that from which the flange 156 projects is a gear-annulus 158, projecting from said face. Meshing with each annulus is a pinion 159, loosely mounted on a shaft 160, and upon each pinion is formed a triangular plate 161, of such dimensions that one flat or straight edge thereof lies against the periphery of the wheel, as in Fig. 12, and prevents the rotation of the pinion. At such times, however, as the revolution of the wheel brings its pocket 157 around to the triangular plate 161 the angle of the latter will pass into said pocket and allow the pinion to turn a part revolution until the succeeding edge of the plate comes against the periphery of the wheel on the other side of the pocket. As this takes place, the toothed flange 156 engages the pinion, turning it, and thereby imparting a single step movement to the next register-wheel. In this manner the change necessary to secure permutation of the numbers on the disk is made throughout the series, and the wheels are locked against accidental displacement at other times. Outside the units-wheel and rigid therewith is a ratchet-disk 162, and rigid with both said ratchet and the units-wheel is a star-gear 163. Engaging with said star-gear is an escapement-fork 164 upon the register-lever 151. The extremities 165 of the fork are angular to engage the teeth of the star-gear, and the organization is such that as the escapement-fork rises the lower branch enters the teeth of the gear 163 and advances the gear half the distance required for a single shift. The fall of the lever completes this operation by advancing the wheel the remaining distance.

Upon the register-lever 151 is mounted the pawl 166, having its nose engaging with the ratchet 162. Upon the back of the pawl 166 is mounted the second supplemental pawl 167. The nose of the latter is so arranged with relation to that of the pawl 166 that they will engage alternately with the said ratchet, one or other of said pawls being at all times in holding engagement. Suitable springs hold these pawls in constant engagement with the ratchet.

We oil the bearings of the mechanism by means of oil-tubes 168, leading to the top of the casing or other convenient point or points where they may be supplied. In the axial bearings an oil-chamber 169 may be bored across the axis beneath the shaft, as in Fig. 14. A piece of wick, felt, or other absorbent 170 may be placed in this chamber, which is then closed by a plug 171 and filled with oil by way of the tube 168. The fountain-cup of the inking mechanism may be supplied by a tube 171$^a$ in a similar manner. The mouths of the tubes in the wall of the casing are closed by screw-plugs tapped into the casing.

The mechanism thus far set forth is adapted to the printing and registration of tickets of a single price only, since in those cases where the price is changed at different parts of the same day it would not be practicable to open the casing, remove the form, and replace it with a different one. Changes of this character must be made by the operator without access being had to the interior of the casing. In order, therefore, to provide for those cases where it is required to sell tickets of different prices at different times, we have provided the following construction and arrangement of parts:

Upon the rearward end of the casting 107 we form a bracket 172. Removing the rigid shaft 108 and detaching the bracket 106, we mount upon the shaft a circular form-carrier 173, Figs. 30 and 26, having at intervals form-plates of different price. Upon the end of the shaft which supports the carrier is a miter-gear 174, and in engagement with said miter is a second miter 175 upon a vertical axis, its shaft 176 having bearing in the bracket 172. Upon the upright shaft 176 is formed a hub 177, which rests on the bracket, and above the hub is formed or mounted a disk 178. (See Figs. 29 and 30.) An annular section 179 of this disk is struck up, as in Fig. 30, and at regular intervals in its edge are formed the recesses 180 and notches 181, arranged in close proximity to each other. Upon the disk 178 is mounted the register lock-disk 182, having a straight face, whereby a narrow space 183 will be left between the outer portions of said disks. Upon the lock-disk 182 is formed a forked bracket 184, and at a single point in its edge is cut a recess 185 and a notch 186, for a purpose to be immediately described. Having its fulcrum in the forked bracket 184 is the register-lever 187, having its extremity provided with a horizontal cross-pin 188, projecting upon both sides, which is of such form as to readily enter and engage with the notched or forked end of the lever operating the units-wheel of the train. The power end of the register-lever 187 is forked horizontally to partly embrace a drop-shaft 189, lying in the longitudinally-bored shaft 176, said shaft 189 having a cross-pin 190, the ends of which lie in notches 191 (see Fig. 26) of the fork of the lever. The lever is curved (see Fig. 27) between the bracket 184 and the edge of the disk to bring the cross-head or pin 188 into the recess 185, while the end of the lever next said pin lies in the notch 186. The separate register-trains are arranged upon the several interior faces of an extension-cap 193 of the octagonal casing (presently to be described) in such manner that when the parts are in the position shown in Figs. 26 and 27, and already described, the several levers 194, which operate the units-wheels, have their forked ends lying in such position as to engage the cross-head 188 on the lever 187 as the latter is swept around upon the axis of the disk 182.

Inasmuch as every sale of the same denomination must be registered upon the same train, there must be such a relative movement of the form-carrier 173 and the register-lever 187 as will always engage the latter with the same lever 194 whenever the same form is brought into printing position. This relation is maintained by the gearing 174 and 175. To impart the necessary movement a crank 195 is mounted upon the end of a shaft 196, which projects through the casing, and this crank moves over an arc on the outer face of the said casing. (See Fig. 32.) A nipple 197 on the back of the crank-arm engages at intervals with small recesses or apertures in the casing-wall, each of which may be distinguished by a number denoting the price to which the form-carrier will be adjusted for operation in case the nipple engages such recess. A miter-gear 198 on the end of the shaft 196 meshes with a miter 174ᵃ, and the smaller miter 174 upon the same horizontal shaft meshes with the miter-gear 175. The register-lever 187 is actuated by the vertical movement of the drop-shaft 189. This is effected by a lever 200, fulcrumed on a bracket 201 and having a forked end 202, which straddles the grooved part 203 of the shaft. The other end of the lever is connected by a link 204 to the vibrating platen, by which the registers are all operated, Figs. 26 and 27. Except when the register lock-disk 182 is rotated to bring the recess 185 and notch 186 into line with the forked end of one of the train-levers 194, the forked ends of these levers straddle the periphery of said lock-disk and are thereby prevented from moving. As soon as the cross-head on the end of said lever 187 engages the notched or forked end of one of the train-levers the latter is free to rise, as seen in Figs. 26 and 27.

In order to prevent the machine from being operated, either accidentally or by design, at times when its action is not required, we provide the vertical axis 205, Fig. 3, having a horizontal arm 206, which carries a vertical lock-bar 207. Upon the axis 205 is an arm 208, which is thrown by a spring 209 against the end of an ordinary lock-bolt 210. This bolt may be shot by any form of key desired, whereby the lock-bar 207 will swing under a shoulder 212 upon the vertical bar 90, which forms the connection between the foot-lever 91 and the stroke-plate 87. When we use the extension-cap shown in Fig. 26, we utilize part of these elements to prevent the operation of the machine at all times save when one of the forms upon the multiple form-carrier 173 is in exact position to make an impression. To this end we make the following arrangement of parts: In place of the axis 205 we substitute the shaft 213, having bearing above in a bracket 214 and rigidly connected with or keyed to the arm 206 to move with the same. Upon the upper end of said shaft is rigidly mounted a lever 215, having journaled in one end a roll 216, which rides upon the edge of the disk 178, and at its opposite extremity having a detent or point 127. The length of the lever-arm 215 is such that when the roll 216 drops into one of the recesses 180 the detent 127 will be opposite one of the notches 181. When by the operation of the crank on the horizontal shaft of the miter 174 the disk is revolved and the roll 216 rises out of the recess 180 upon the circular edge of the disk 178, sufficient rotary movement is given to the shaft 213 to throw the lock-bar 207 partly beneath the shoulder 212, thereby preventing the operation of the treadle 91 until such time as the roll 216 shall have again dropped into one of the recesses 180. At night or at such times as the machine is not in use the lock-bolt 210 is shot, and the bar 207 is thereby brought under the shoulder 212, while at the same time the tooth 127 is thrown into engagement with one of the notches 181, locking all the parts of the machine against accidental or intentional displacement.

When printing multiple-price tickets, we arrange the separate registering-frames in the extension-cap, fastened in place in any suitable manner. In this form of mechanism we have shown each train operated by a train-lever 194, pivotally mounted on the shaft of the register-wheels, and carrying a pushing-pawl 219. A holding-pawl 220 prevents reverse movement of the units-wheels, and a stop-pawl 221 is mounted on a pivot 222 and normally thrown out of engagement with the ratchet 223 on the units-wheel by means of a spring 224. The tail of the pawl 221 lies beneath the end of the train-lever 194, whereby the drop of the latter throws the nose of pawl 221 into the teeth of ratchet 223.

In place of the means already described for vibrating the platen we may use the devices shown in Fig. 23, consisting of a star-wheel 228, the teeth of which engage a friction-roll 229 on the platen. A ratchet 230 is rigid with the star-wheel, and a spring-actuated pawl 231 is mounted on the stroke-plate, a holding-pawl 232 being pivoted on a lug projecting from the frame 102. In this case the fall of the platen is by gravity only, instead of being insured by positive means. We may also employ the mechanism shown in Fig. 25, in which a carrier 233 is keyed to the motor-shaft and provided with a yoke-frame 234, fulcrumed at the point 235, and having in its projecting end a friction-roll 236. A stop-pin 237 limits the pivotal movement of the yoke-frame in one direction, and a spring 238 holds its end normally against said pin. As the shaft is operated, the roll 236 is swept against a friction-roll 239 on the platen, raising the latter and at once releasing it. Upon the opposite end of the carrier is journaled a roll 240, which, after the roll 236 passes off the roll 239, engages a bracket 241 on the platen and throws the latter down when gravity fails to effect the same result. As the carrier vibrates back to its normal position, the yoke 234 yields against the tension of the spring 238 to permit the roll 236 to pass the roll 239 on the platen.

In both the constructions heretofore described we provide a post or some similar support 242 to receive the platen as it drops after each imprint. In the construction shown in Fig. 25 we may substitute for such post a bracket 243, projecting from the casing or other support, and mount on the bracket 241 a buffer 244, the bracket 243 having a set-bolt 245, which is adjustable horizontally to properly locate the lowest position of the vibrating platen. When in its normal position, the roll 240 on the plate 233 rests against the bracket 241 and holds the platen down at all times, save when the machine is in the act of operation.

For the purpose of oiling the bearing of the mechanism we may use the devices shown in Fig. 31, in which the numeral 176 denotes the shaft or hub of the register-lock, in which vibrates the shaft or plunger 189, operating the register-lever 187. We may make the plunger 189 hollow and close the lower end of the shaft 177 to form an oil-reservoir. In such case a depression 177$^a$ is formed in the upper surface of the disk 182 to enable the oil to run back, and a cap 189$^a$ is mounted on the plunger to catch any oil thrown upward forcibly by the rapid action of the machine. In the hollow plunger 189 are formed openings 250, which at each downward stroke cut off the escape of the oil save through the upper end of the plunger, but which upon the rise of said plunger to normal position again rise to the depression 177$^a$ and permit the oil to flow back into the hollow plunger and shaft. Each lever 187 and 200, connected to the plunger, has a downward projection 251 to conduct any oil dripping upon said levers back into the depression 177$^a$.

When projected from the hollow plunger, the oil may be received by any suitable form of conductors and carried to the points requiring lubrication. The overflow from these points may in turn be conducted either to an auxiliary reservoir and thence returned to the chamber in the hollow hub and plunger or it may be pumped back from such auxiliary reservoir by a mechanism similar to that described.

It will be evident from the foregoing that while the drop-shaft or plunger 189 performs the function of actuating the registering mechanism by connection with the register-lever 187 such shaft or plunger subserves the purpose of pumping up or elevating the oil from the oil-reservoir for lubricating parts of the machine as the vibrating impression-bed 14 moves in the operation of printing the tickets.

What we claim is—

1. In a ticket-printing machine, the combination of a type-holder, a vibrating platen, a strip-feeder, an axially-oscillating shaft, a vibrator arranged on and vibrated by the oscillations of the shaft and acting to move the platen toward the type-holder, and means, substantially as described, for oscillating the shaft and operating the strip-feeder.

2. In a ticket-printing machine, the combination of a plate-holder, a vibrating platen having a channel for the passage of a continuous ticket-strip, a strip-feeder carried by and moving on the platen, an axially-oscillating shaft, a vibrator mounted on and vibrated by the shaft and acting to move the platen toward the type-holder, and means, substantially as described, for oscillating the shaft and moving the strip-feeder.

3. In a ticket printing and registering machine, the combination, with a rigidly-mounted printing-form, of a vibrating platen having a paper-channel through which a continuous ticket-strip is fed, a feed-carriage moving longitudinally in the paper-channel, a feed-lever reciprocating said carriage, and a cam actuating said lever, substantially as described.

4. The combination, in a ticket-printing machine, of a type-holder, a vibrating platen arranged beneath the type-holder, an axially-oscillating shaft having a vibrator which acts on the platen to raise it toward the type-holder, a register, a register-lever, a link pivotally connecting the register-lever directly to the platen to operate the register by the rising movement of the latter, and means, substantially as described, for oscillating the shaft.

5. In a ticket printing and registering machine, the combination, with the printing and registering mechanism, of a stroke-plate connected to the actuating-lever, a check-roll journaled in a frame vibrating on said stroke-plate, and an arch rigid on the interior frame of the machine, beneath and in contact with which said check-roll moves, substantially as described.

6. In a ticket printing and registering mechanism, the combination, with a platen pivotally supported at or near one end and having a continuous paper-channel, of a swinging lift-bar and a rigid drop-bracket depending from said platen, a vibrator having an angular head engaging a pocket in the lift-bar, and provided with an arm capable of engaging a pocket in the drop-bracket when the platen is raised and clearing said pocket when it is lowered, substantially as described.

7. The combination, with a platen having pivotal support at or near one end and provided with a countersunk channel covered by a slotted plate extending from end to end of said platen, of a feed-carriage moving in the countersunk space and having ribs lying in the slots of the covering-plate, a clamp-plate engaging with said ribs, a clamping-lever supporting said plate, and a feed-lever connected to the clamping-lever and reciprocating the carriage, substantially as described.

8. The combination, in a ticket-printing machine, of a type-holder, a vibrating strip-supporting platen, a paper-strip feeder for advancing the strip on the platen, a strip-cutter carried by the platen, a register for registering the printing and delivery of the tickets, a register-lever, and means, substantially as described, for actuating the impression-platen and operating the register-lever by the vibrating motion of the platen.

9. The combination, in a ticket-printing machine, of a type-holder, a vibrating platen, a paper-feeder carried by and movable on the platen, a feed-lever for operating the paper-feeder, a rotating shaft, a vibrator on the shaft which acts to move the platen toward the type-holder, and a cam on the shaft acting on the feed-lever, substantially as described.

10. The combination, in a ticket-printing machine, of an external casing having a part of its wall removable and replaceable, a type-holder, a bracket carrying the type-holder, a platen, and a plate carried by the removable wall-section and having pockets to receive the interchangeable dating stamp or type, substantially as described.

11. The combination, in a ticket-printing machine, of a type-holder, a pivoted vibrating strip-supporting platen arranged below the type-holder and having at one end an attached knife-blade, a movable shear-blade, and means, substantially as described, for vibrating the platen and operating the movable shear-blade as the platen rises toward the type-holder.

12. The combination, in a ticket-printing machine, of a type-holder, a vibrating strip-supporting platen, a motor-shaft having cams, a stroke-plate keyed on the shaft and having a beveled end, a vibrating check-yoke mounted on the stroke-plate and having a check-roll journaled in the check-yoke, a spring centering the check-yoke on the stroke-plate, a foot-lever linked to the stroke-plate, and a rigid arch above the stroke-plate, check-yoke, and vibrating platen, substantially as described.

13. The combination, in a ticket-printing machine, of a type-holder, a vibrating strip-supporting platen, a cam-shaft, the stroke-plate keyed on the shaft and having a double beveled end, a foot-lever connected with the stroke-plate, a check-yoke pivoted on the beveled end of the stroke-plate and having a check-roll, and a rigid arch located over the stroke-plate, check-yoke, and vibrating platen, substantially as described.

14. The combination, in a ticket-printing machine, of a type-holder, a vibrating platen, a ticket-strip feeder carried by and movable on the platen, a feed-lever for operating the feeder, and means, substantially as described, for actuating the platen and feed-lever.

15. In a ticket printing and registering machine, the combination, with a rigidly-mounted form printing the body of the ticket, of a casing for the machine, having a removable section, and a supporting-plate integral with said removable section of the machine-casing and having supports for the several dating-stamps, substantially as described.

16. The combination, in a ticket-printing machine, of a multiple printing-frame shiftable from one position to another, a vibrating strip-supporting platen, a ticket-register, a register-lever for operating the register, a link connected with the platen and rising to and connected with the register-lever, a register-locking disk geared to the multiple printing-frame, a vertical lock-bar for arresting the movement of the machine, and means, substantially as described, for operating the lock-bar at each shift of the printing-frame.

17. The combination, in a ticket-printing machine, of a multiple printing-frame shiftable from one position to another, a vibrating strip-supporting platen, a ticket-register, a register-lever, a link-connection between the register-lever and platen, substantially as described, for operating the register, a register-locking disk geared to the multiple printing-frame and having a release-recess in which a shifting-lever lies, a recessed disk carried by the shaft of the register-locking disk, and a shaft having a vertical lock-bar for arresting the movement of the machine and provided with a roll running on the recessed disk.

18. In a ticket printing and registering machine, the combination, with a type-form, of an inking-roller mounted upon a vibrating frame operated by a cam on the shaft of the machine, a pivotally-mounted fountain-cup having a fountain-roller, a pin having a conical end moving between the cup and its supporting-frame to tilt the same upward to bring the fount-roller and form-roller in contact, and means for actuating said pin without access to the casing, substantially as described.

19. In a ticket printing and registering machine, the combination, with a stationary type-holder, of an inking-roller mounted in a vibrating frame, a fountain-cup pivotally mounted on an adjacent support and having a fount-roller journaled therein, a spring-retracted pin having a conical point lying between the fountain-cup and its support, a slotted shaft jointed to the prolonged shaft of the fount-roller and projecting through the wall of the casing to the outside thereof, a sleeve mounted on said shaft and having a flange or button engaging the end of said pin, and a cross-pin inserted in the slot of the shaft through the walls of the surrounding sleeve, substantially as described.

20. The combination, in a ticket-printing machine, of a stationary type-holder, a pivoted spring-pressed yoke-frame carrying an inking-roller and having an arm extended rearwardly from its pivot-point, an elbow-lever connected with said arm, a shaft to which the elbow-lever is connected, a vertical link connected with the elbow-lever, a pivoted oscillating lever connected with the link, and a shaft having a cam, the rotation of which oscillates the said pivoted lever, substantially as described.

21. The combination, in a ticket-printing machine, of a type-holder, a vibrating strip-supporting impression-bed for effecting the successive printing of the tickets, a ticket-register-operating lever, an oil-pump having a hollow plunger or drop-shaft connected with the register-lever to operate the same, and means, substantially as described, for reciprocating the plunger or drop-shaft as the impression-bed vibrates to and from the type for pumping up oil.

22. The combination, in a ticket-printing machine, of a type-holder, a vibrating strip-supporting impression-bed for effecting the printing of the tickets, a ticket-register, a register-operating lever, an oil-pump having a hollow plunger or drop-shaft connected with the register-lever to operate the same, and link-and-lever connections between the impression-bed and the pump-plunger or drop-shaft for raising oil as the bed vibrates.

In testimony whereof we affix our signatures in presence of two witnesses.

J. PARIS DUNN.
JAMES BRADY.

Witnesses:
  EUGENE UNDERHILL,
  GUSTAVUS W. RAWSON.